United States Patent Office 3,427,197
Patented Feb. 11, 1969

3,427,197

METHOD FOR PLATING THIN TITANIUM FILMS

William M. Lilker, Palo Alto, Calif., assignor to Lockheed Aircraft Corporation, Burbank, Calif.

No Drawing. Filed Jan. 27, 1965, Ser. No. 428,554
U.S. Cl. 117—213 7 Claims
Int. Cl. C23c 3/02

ABSTRACT OF THE DISCLOSURE

The invention is directed to a method of plating nickel over thin films of titanium and related metals of several microns thick which are utilized in micro-miniature electrical circuitry. The thin metallic film circuitry which may be deposited on a substrate such as ceramic is prepared for electroless plating by cleaning in an electrocleaner solution, treating in a deoxidizing solution and immersing in an activator solution. The resulting nickel-plating provides solderable or weldable surfaces on the substrate.

This invention relates to an improved method of plating thin titanium films, and more particularly to an improved method for nickel-plating thin titanium films by an electroless process for providing solderable or weldable surfaces.

As a result of the growing importance of micro-miniaturization in present-day electronics, considerable effort is being expended in the search for high-quality miniaturized circuitry and improved techniques for their manufacture. Attention is being given to thin-film circuitry because of its inherent simplicity, versatility and compactness. In this endeavor, the provision of high-quality, solderable or weldable areas associated with these micro-miniaturized circuits has proven to be an extremely difficult problem, especially where unusual thin conductive films deposited on insulative substrates, such as ceramic, for example, which hold a circuit. More particularly, this problem becomes more pronounced when certain metals which become oxidized on the outer surface rather easily are utilized to form the circuit pattern on the substrate. Metals as titanium, hafnium, zirconium and uranium are such metals, for examples, and these metals have less affinity for welding or soldering in an air environment than certain other metals, owing to the fact that they may become slightly oxidized before or during the soldering or welding processes.

In the prior art little attention was given to the problem of plating on such thin metallic films, but attention was rather directed toward plating metal surfaces having substantial thicknesses, far in excess of several microns as is the case with the thin-films utilized in micro-miniaturization circuitry. Thus, the prior art had little, if any, significant appreciation for the types of problems or difficulties that would be encountered in attempting to use prior art techniques or chemicals to plate such thin-films. In the prior art, it was generally considered necessary to prepare the surface to be plated by sanding, blasting, brushing, grinding, buffing, abrading, electrical etching, etc., so as to remove a significant portion of the outer surface thereof in order to enhance the roughness of the surface so as to establish the base for good mechanical bonding between the metal surface to be plated and the plating material. Once the surface roughening process was completed, it was then possible to subject the metal surface to a series of chemical processes which would terminate in the uniform coating on the metal surface with tenacious adherence. Such prior art processes consisted essentially of treating the surface of the metal by roughening and then with a catalytic material so as to form thereon firmly anchored growth nuclei, it being unnecessary to achieve a complete coverage of the roughened surface with the growth nuclei since the plating material tends to spread for a certain distance from each growth nucleus in two dimensions along the surface of the metal to be coated as it builds up in the third dimension upon the growth of the nucleus.

Accordingly, it is the general objective of the present invention to provide an improved process of chemical plating of extremely thin-metallic films on the order of microns thick that is simple and economical to carry out commercially.

Another object of the invention is to provide an improved process of metal plating on unusually thin metallic films to produce bonds therebetween of high tensile strength.

Still another object of the invention is to provide an improved process of producing an intimately bonded layer of nickel on thin films formed essentially of such materials as titanium, hafnium, zirconium, and uranium.

A further object of the invention is to provide a process for depositing a metal coating on thin titanium film deposited on a ceramic substrate by metal plating whereby the plating is deposited on the thin titanium film by immersing the ceramic substrate and associated film in an aqueous chemical nickel plating bath of the nickel cation-hypophosphite anions.

Still a further object of the invention is to provide a process wherein the coated titanium film is subjected to a heat diffusion step to provide heretofore unknown tenacious adherence of the thin film and the metal overcoating to the substrate.

The invention, both as to its organization and method of operation, together with further objects and advantages thereof, will be best understood by reference to the following specification and the claims.

In accordance with the process of the present invention, a ceramic substrate having an extremely thin film of metal, such as titanium, for example, deposited thereon in the form of an electrical circuit according to the fused salt process disclosed in U.S. Patent 3,022,201 by Ross A. Quinn and Robert A. Karlak issued February 20, 1962, which is ultimately plated in preselected areas by the use of an electroless nickel bath. The substrate containing the thin-film titanium circuitry is first prepared by methodically cleaning it in an aqueous solution of alkaline electrocleaner for a preselected period of time, with a preselected voltage and current applied thereto while immersed in the solution. Thereafter the substrate is removed from the electrocleaner solution and the substrate is thoroughly rinsed in water. After the surface of the titanium film is thus cleaned, the substrate with the thin film circuit is immersed in a suitable deoxidizer solution for a preselected period of time to remove any slight oxide coating which may be on the surface of the metallic film and then it is rinsed with water. Thereafter the substrate with the titanium film is immersed for a preselected period of time in an activator solution, and then removed therefrom and rinsed with water. It should be particularly noted at this point that the concentration of the activator material required for the activator solution is extremely low. Next the ceramic substrate with the thin titanium film thereon is immersed in the electroless nickel bath for a preselected period of time and then removed and rinsed thoroughly in water. Finally, the nickel coated metallic film on the substrate is subjected to a heat treatment for a preselected period of time. After the preselected period of time has elapsed, the coated ceramic may be removed from the furnace and permitted to cool to room temperature. The resulting nickel coating over the extremely thin titanium film is a tenaciously bonded one having high tensile strengths for either soldering or welding purposes. The tensile tests which have been performed on such plated surfaces have revealed that the plating exhibits tensile strengths greater than heretofore known in the prior art.

While practicing the method of the present invention it has been found that the following range of percentages for the chemical ingredients may be used with varying degrees of success:

| | | |
|---|---|---|
| Alkaline electro-cleaner solution: | | |
| Sodium hydroxide | percent by wt. | 5–10 |
| Water | | Remainder |
| Deoxidizer solution: | | |
| Chromium trioxide | percent by wt. | 2–6 |
| Hydrofluoric acid (49%) | percent by vol. | 0.5–1.5 |
| Water | | Remainder |
| Activator solution: | | |
| Palladium chloride | percent by wt. | 0.05–0.15 |
| Hydrochloric acid | percent by vol. | 0.05–0.15 |
| Water | | Remainder |
| Electroless nickel bath: | | |
| Nickel sulphate | percent by wt. | 1.5–2.5 |
| Lactic acid | do | 2.2–3.2 |
| Propionic acid | do | 0.15–0.25 |
| Sodium hypophosphite | do | 1.9–2.9 |
| Water | | Remainder |

An example of the specific preparation solutions and electroless nickel bath which has been employed successfully to plate thin metallic films, in particular, titanium films where the films have an electrical characteristic of 4 to 20 ohms per square inch, may serve to illustrate how the present invention can be utilized to provide heretofore unrealized solderable or brazable surfaces:

| | | |
|---|---|---|
| Alkaline electro-cleaner solution: | | |
| Sodium hydroxide | gm./liter | 75 |
| Water | | Remainder |
| Deoxidizer solution: | | |
| Chromium trioxide | gm./liter | 40 |
| Hydrofluoric acid (49%) | ml./liter | 10 |
| Water | | Remainder |
| Activator solution: | | |
| Palladium chloride | gm./liter | 1 |
| Hydrochloric acid | ml./liter | 1 |
| Water | | Remainder |
| Electroless nickel bath: | | |
| Nickel sulphate | gm./liter | 20 |
| Lactic acid | do | 27 |
| Propionic acid | do | 2 |
| Sodium hypophosphite | do | 24 |
| Water | | Remainder |
| pH | | 4.2–4.4 |

Utilization of the solutions and the electroless nickel bath set forth above may be readily applied to preselected areas of a thin titanium circuit pattern deposited on a ceramic substrate according to the following steps:

First, a ceramic substrate coated with an extremely thin film of titanium, on the order of several microns thick, is immersed in the eletrocleaner solution, for a period on the order of 30 seconds. During this step a direct current voltage on the order of 6 to 10 volts at 1 to 10 amperes is passed through the solution and the titanium film. The negative side of the power supply is connected to the thin titanium film on the ceramic substrate and the positive side is connected to the conductive container which contains the electrocleaner solution and substrate. After this first processing step is completed, the substrate is removed from the electrocleaner solution and thoroughly rinsed in water. This first step cleans the surface of both the ceramic substrate and the titanium film circuitry without any etching of the titanium film.

Secondly, the substrate is immersed in the deoxidizer solution for a short period on the order of 1 to 5 seconds and then rinsed thoroughly in water. This step removes any slight oxide coating on the surface of the titanium film. It should be noted that although this step removes any slight coat of oxide on the titanium, it is not considered an "etching" step as is understood in the prior art. More particularly, this step is not intended as a "roughening" step since the film is extremely thin and any significant etching thereof as contemplated in the prior art is extremely undesirable, since to do so might easily remove the thin film in part or completely. Thus the period of time during which the film is subjected to the deoxidizer is important and the strength of deoxidizer is also important so as to avoid any significant etching.

Thirdly, the substrate is immersed in the activator solution for a period on the order of 10 minutes and then thoroughly rinsed in water. No further processing at this step is necessary to activate the palladium which adheres to the titanium in the form of nuclei particles. As noted above, the concentration of activator salt is extremely low, on the order of 1 gram per liter. It is important to note that the concentration should be kept as low as indicated since larger concentrations have been found to be undesirable.

Fourthly, the ceramic substrate with the titanium film and growth nuclei thereon is immersed in the electroless nickel bath for a period on the order of seven minutes and then rinsed thoroughly in water. During this step it is essential to keep the electroless nickel bath at a temperature in the range of 80° C. to 85° C., by means of suitable temperature control devices. The thickness of the nickel coating is dependent upon the time the work piece is permitted to remain immersed in the electroless bath and the temperature of the bath. The time and temperature range described have been found to be preferred, but are not to be construed as a limitation of the invention.

Finally, the nickel coated titanium is subjected to a diffusion sintering step during which the temperature of this ceramic with the coated titanium thereon is raised to a temperature in the range of 300° C. to 500° C., but a temperature of about 400° C. ±20° C. is preferred, in an air atmosphere for a period on the order of 10 minutes. After the 10 minutes' heat treatment, the ceramic substrate is allowed to cool to room temperature.

The electroless nickel braze areas or solder pad areas produced by the specific bath and solutions described above have produced a coating having tensile strengths on the order of 2,500 to 5,000 pounds per square inch.

In closing, it is useful to summarize some of the advantages of the present invention. One such advantage is derived from the low temperature diffusion heat treatment to which the thin titanium film and nickel plating are subjected which eliminates the undersirable reduction of resistivity of the thin titanium film heretofore experienced in prior art, e.g., the present process eliminates the exposure to higher temperatures which causes resistant conversion to be less significant than it would be if the titanium films were subjected to a higher temperature. In addition, the low heat treatment eliminates any possible alteration of the structural configuration of the titanium film on he ceramic substrate heretofore experienced in the prior art, when the plated substrate is raised to elevated temperatures significantly higher than is used according to the present invention. Furthermore, the present invention permits the process to be used in air atmosphere instead of vacuum, since the titanium is not appreciably oxidized.

Another advantage is the provision of preselected areas which may be readily soldered to or welded to thereby enhancing the versatility of the thin titanium micro-miniaturized circuitry. Finally, the method defined by the present invention provides a means heretofore unavailable for depositing tenaciously adhering nickel coatings to an extremely thin film of titanium which is on the order of microns thick.

It is to be understood in connection with this invention that the method and example described herein is only exemplary and that various modifications may be made without departing from the scope of the invention as defined in the appended claims.

What is claimed is:

1. The process of producing an intimately bonded and continuous layer of nickel on the surface of the thin film of titanium on the order of several microns thick which is supported on a substrate, which comprises the steps of immersing a ceramic substrate containing a thin film of titanium in an electrocleaner solution and passing an electric current therethrough for a period on the order of thirty seconds to remove surface contaminates contained thereon, rinsing the ceramic substrate and deposited thin film of titanium, immersing the substrate containing said titanium film in a deoxidizer to remove any surface titanium dioxide on the surface of said thin film, rinsing the ceramic substrate and deposited thin film of titanium, immersing the substrate and thin film of titanium deposited thereon in an activator solution to deposit a plurality of growth nuclei particles on the surface of the titanium that are catalytic to the plating bath of the nickel cation hyphophosphite anions type, rinsing the ceramic substrate and deposited thin film of titanium, immersing the substrate in a plating bath of nickel cation hyphophosphite anions type for a sufficiently long period to effect chemical nickel plating of an electrical conductive coating on said titanium and then finally rinsing the ceramic substrate and the film of nickel deposited thereon and subjecting said coated titanium film on said substrate to a heat treatment between 380° C. and 420° C. for a period of time sufficient to sinter the nickel and titanium.

2. The process for producing an intimately bonded and continuous layer of nickel upon the surface of a thin film of titanium having a thickness on the order of several microns and which is deposited on a ceramic substrate, which comprises the steps of removing any contamination from the surface of said substrate and titanium film by means of an electrocleaning process, rinsing the ceramic substrate and deposited thin film of titanium, deoxidizing the surface of the thin titanium film by immersing the substrate in a deoxidizing solution, rinsing the ceramic substrate and deposited thin film of titanium, activating the surface of the titanium film by depositing thereon a plurality of growth nuclei particles by immersing the ceramic substrate in an activator solution, rinsing the ceramic substrate and deposited thin film of titanium, coating the thin titanium film in an electroless nickel bath by immersion therein, and then finally rinsing the ceramic substrate and the film of nickel deposited thereon, and heat treating the nickel-coated thin titanium film surface to thereby diffuse sinter the nickel and the thin titanium film to produce on cooling a strong mechanical and chemical bond therebetween which tenaciously adheres to the ceramic substrate.

3. An improved process for producing an intimately bonded and continuous layer of nickel on the surface of a thin film of titanium deposited on a ceramic article, the thin titanium film having a thickness on the order of several microns, which comprises the steps of electro-cleaning the surface of thin titanium film, rinsing the ceramic substrate and deposited thin film of titanium, chemically removing any oxides on the surface of the thin titanium film, rinsing the ceramic substrate and deposited thin film of titanium, chemically depositing a plurality of minute particles on the surface of the thin titanium film which form growth nuclei thereof, rinsing the ceramic substrate and deposited thin film of titanium, depositing a layer of nickel over the titanium film by electroless plating and then finally rinsing the ceramic substrate and the film of nickel deposited thereon and diffusion sintering said nickel coating and the thin titanium film to produce on cooling a strong mechanical and chemical bond therebetween which tenaciously adheres to the article.

4. An improved process for producing an intimately bonded and continuous layer of nickel on the surface of a thin titanium film deposited on a ceramic article, the titanium film having a thickness on the order of several microns, which comprises the steps of immersing the titanium-coated article in a first solution as part of an electrocleaning process passing an electric current therethrough rinsing the ceramic substrate and deposited thin film of titanium, immersing the article in a second solution to remove any titanium dioxied on the surface of the thin titanium film, rinsing the ceramic substrate and deposited thin film of titanium, immersing the article in a third solution to deposit a plurality of catalytic particles on the surface of the thin titanium film, rinsing the ceramic substrate and deposited thin film of titanium, immersing the article in an electroless nickel bath for plating a layer of nickel on the titanium film and then finally rinsing the ceramic substrate and the film of nickel deposited thereon, and heat-treating the nickel-coated titanium film to produce on cooling a strong mechanical and chemical diffused sintered bond therebetween which adheres tenaciously to the article.

5. An improved process for producing an intimately bonded and continuous layer of nickel on the surface of a thin titanium film deposited on an article of ceramic, the titanium film having a thickness on the order of several microns which comprises the steps of immersing the titanium coated ceramic article in an aqueous alkaline electrocleaner solution consisting essentially of sodium hydroxide and water as the remainder of said solution and passing an electric current therethrough for electrocleaning said article and thin titanium film, rinsing the ceramic substrate and deposited thin film of titanium, next immersing the ceramic article in an aqueous deoxidizer solution consisting esesntially of chromium trioxide, 49% hydro fluoric acid and water as the remainder of said solution, to remove any titanium dioxide on the surface of the thin titanium film, rinsing the ceramic substrate and deposited thin film of titanium, then immersing the ceramic article in an aqueous activator solution consisting essentially of palladium chloride, hydrochloric acid and water as the remainder of said solution to deposit a plurality of catalytic particles on the surface of the thin titanium film, rinsing the ceramic substrate and deposited thin film of titanium, next immersing the ceramic article in an aqueous electroless nickel bath consisting essentially of nickel sulphate, lactic acid, propionic acid and sodium hypophosphite and water as the remainder of said solution, said bath having a pH in the range of 4.2 to 4.4, for plating a layer of nickel on the thin titanium film, and then finally rinsing the ceramic substrate and the film of nickel deposited thereon, and finally heat treating the thin nickel-plated titanium film to produce on cooling a strong mechanical and chemical bond therebetween which tenaciously adheres to the ceramic article.

6. An improved process for producing an intimately bonded and continuous layer of nickel on the surface of a thin titanium film deposited on a ceramic article, the titanium film having a thickness on the order of several microns, which comprises the steps of firstly immersing the titanium-coated ceramic article in an aqueous solution consisting essentially by weight 7% sodium hydroxide and water as the remainder of said solution for electrocleaning, during the electrocleaning step a direct current voltage in the range of 6 to 10 volts and 1 to 10 amperes being passed through the thin titanium film and the solution for a period of time on the order of 30 seconds, rinsing the ceramic substrate and deposited thin film of titanium; secondly, immersing the titanium-coated article in an aqueous solution consisting essentially by weight of about 4% chromium trioxide, and by volume 1.0% to 49% hydrofluoric acid and water as the remainder of said solution for a period on the order of 5 seconds to remove any titanium dioxide on the surface of said titanium coated article, rinsing the ceramic substrate and deposited thin film of titanium; thirdly, immersing the titanium coated article in an aqueous solution consisting essentially by weight 0.1% palladium chloride, by volume 0.1% hydrochloric acid and water as the remainder of said solution for a period on the order of 10 minutes, to deposit a plurality of catalytic particles on the surface of the thin titanium film, rinsing the ceramic substrate and deposited thin film of titanium, immersing the titanium-coated article in an electroless nickel bath consisting essentially by weight of 2% nickel sulphate, 2.7% lactic acid, .2% propionic acid, 2.4% sodium hypophosphite and water as the remainder of said bath, where the electroless nickel bath has an pH in the range of 4.2–4.4, during said last mentioned step said electroless nickel bath is kept at a temperature in the range of 80° C. to 85° C., and then finally rinsing the ceramic substrate and the film of nickel deposited thereon, and finally subjecting said nickel coated titanium film on the ceramic article to a heat treatment between 380° C. and 420° C. for a period of time on the order of 10 minutes to sinter the nickel and titanium to produce on cooling a strong mechanical and chemical bond therebetween which tenaciously adheres to the ceramic article.

7. An improved process for producing an intimately bonded and continuous layer on the surface of a thin titanium film deposited on an article of ceramic, the titanium film having a thickness of several microns, which comprises the steps of immersing the titanium-coated ceramic article in an aqueous alkaline electrocleaner solution consisting essentially by weight of 5 to 10% sodium hydroxide and water as the remainder of said solution and passing an electric current therethrough of 1 to 10 amperes at 6 to 10 volts for electrocleaning the thin titanium film deposited on the article of ceramic and then rinsing the article of ceramic and the film of titanium deposited thereon, next immersing the ceramic article on the order of 1 to 5 seconds in an aqueous deoxidizer solution consisting essentially by weight of 2 to 6% chromium trioxide, by volume 0.5 to 1.5% of 49% hydrofluoric acid and water as the remainder of said solution, to remove any titanium oxide on the surface of said thin titanium film and then rinsing the article of ceramic and the film of titanium deposited thereon, then immersing for at least 10 minutes the ceramic article in an aqueous activator solution consisting essentially by weight of 0.05 to 0.15% palladium chloride, by volume 0.05 to 0.15% hydrochloric acid and water as the remainder of said solution, to deposit a plurality of catalytic particles on the surface of the thin titanium film and then rinsing the article of ceramic and the film of titanium deposited thereon, next immersing for at least 7 minutes the ceramic article in an aqueous electroless bath consisting essentially by weight 1.5 to 2.5% nickel sulphate, 2.2 to 3.2% lactic acid, .15 to .25% propionic acid and 1.9 to 2.9% sodium hypophosphite and water as the remainder of said solution, said bath being maintained at a temperature of 80° C. to 85° C. and having a pH in the range of 4.2 to 4.4, for plating a layer of nickel on a thin titanium film, and then finally rinsing the articles of ceramic and the film of nickel deposited thereon and finally heat treating the nickel coated thin titanium film for at least 10 minutes at 380° C. to 420° C. to produce on cooling a strong mechanical and electrical bond therebetween which tenaciously adheres to the ceramic article.

References Cited

UNITED STATES PATENTS

| | | | |
|---|---|---|---|
| 3,357,858 | 12/1967 | Gravey | 117—213 |
| 2,292,026 | 8/1942 | Gillett. | |
| 2,454,610 | 11/1948 | Narcus | 117—213 |
| 2,746,888 | 5/1956 | Ross | 117—221 |
| 2,848,359 | 8/1958 | Talmey | 117—212 |
| 2,928,757 | 3/1960 | Lee et al. | 117—50 |
| 3,022,201 | 2/1962 | Quinn et al. | 117—221 |
| 3,029,158 | 4/1962 | Lee et al. | 117—50 |
| 3,180,807 | 4/1965 | Quinn | 117—221 X |

OTHER REFERENCES

Loven, O. H., The Cleaning of Metals Before and After Plating. In the Metal Industry. 29(7): pp. 291–292, July 1931.

ALFRED L. LEAVITT, *Primary Examiner.*

J. R. BATTEN, *Assistant Examiner.*

U.S. Cl. X.R.

117—212, 217, 221, 47, 130; 204—32